(12) United States Patent
Won et al.

(10) Patent No.: US 10,795,875 B2
(45) Date of Patent: Oct. 6, 2020

(54) DATA STORING METHOD USING MULTI-VERSION BASED DATA STRUCTURE

(71) Applicants: Industry-University Cooperation Foundation Hanyang University, Seoul (KR); UNIST ACADEMY-INDUSTRY RESEARCH CORPORATION, Ulsan (KR)

(72) Inventors: You Jip Won, Seoul (KR); Beom Seok Nam, Ulsan (KR)

(73) Assignees: Industry-University Cooperation Foundation Hanyang University, Seoul (KR); UNIST Academy-Industry Research Corporation, Ulsan (KR)

( * ) Notice: Subject to any disclaimer, the term of this patent is extended or adjusted under 35 U.S.C. 154(b) by 308 days.

(21) Appl. No.: 15/752,059

(22) PCT Filed: Aug. 12, 2015

(86) PCT No.: PCT/KR2015/008463
§ 371 (c)(1),
(2) Date: Feb. 12, 2018

(87) PCT Pub. No.: WO2017/026556
PCT Pub. Date: Feb. 16, 2017

(65) Prior Publication Data
US 2018/0225318 A1 Aug. 9, 2018

(51) Int. Cl.
*G06F 17/30* (2006.01)
*G06F 16/22* (2019.01)
(Continued)

(52) U.S. Cl.
CPC ........ *G06F 16/2272* (2019.01); *G06F 3/0604* (2013.01); *G06F 3/0644* (2013.01);
(Continued)

(58) Field of Classification Search
CPC ............ G06F 16/2272; G06F 16/2365; G06F 3/0604; G06F 3/0644; G06F 3/0652; G06F 3/0656; G06F 3/0673; G06F 21/52
See application file for complete search history.

(56) References Cited

U.S. PATENT DOCUMENTS 5,089,952 A  2/1992 Bozman
7,555,491 B2 * 6/2009 Cole ................... G06F 16/2282
(Continued)

FOREIGN PATENT DOCUMENTS

WO  2014/143005 A1  9/2014

OTHER PUBLICATIONS

Beomseok Nam, "Resolving Journaling of Journal Anomaly via Weaving Recovery Information into DB Page", NVRAMOS '14, UNIST, Oct. 30, 2014, 60 pages.
(Continued)

*Primary Examiner* — Huawen A Peng
(74) *Attorney, Agent, or Firm* — Sughrue Mion, PLLC (57) ABSTRACT

A data storing method performed by a data storing apparatus according to an exemplary embodiment of the present invention includes a step of calling insert operation for storing first data in a first page having a space for storing data, a step of checking whether overflow in which there is no space for storing the first data in the first page occurs, a step of checking whether the overflow occurs in the first page and dead data is stored in the first page, and a step of generating an overflow buffer page to store the first data in the overflow buffer page when the overflow occurs in the first page and the dead data is stored in the first page and there is a transaction accessing the dead data.

5 Claims, 6 Drawing Sheets

(51) Int. Cl.
  *G06F 16/23* (2019.01)
  *G06F 21/52* (2013.01)
  *G06F 3/06* (2006.01)

(52) U.S. Cl.
  CPC .......... *G06F 3/0652* (2013.01); *G06F 3/0656* (2013.01); *G06F 3/0673* (2013.01); *G06F 16/2365* (2019.01); *G06F 21/52* (2013.01)

(56) References Cited

U.S. PATENT DOCUMENTS

| | | | |
|---|---|---|---|
| 9,390,116 B1* | 7/2016 | Li | G06F 16/2272 |
| 9,519,664 B1* | 12/2016 | Kharatishvili | G06F 16/316 |
| 2005/0132374 A1 | 6/2005 | Flood et al. | |
| 2007/0118547 A1* | 5/2007 | Gupta | G06F 16/2272 |
| 2008/0228795 A1* | 9/2008 | Lomet | G06F 16/2477 |
| 2010/0161567 A1* | 6/2010 | Makela | G06F 16/22 |
| | | | 707/693 |
| 2011/0252067 A1 | 10/2011 | Marathe et al. | |
| 2012/0215997 A1 | 8/2012 | Stanfill et al. | |
| 2014/0040199 A1* | 2/2014 | Golab | G06F 16/211 |
| | | | 707/634 |
| 2014/0214767 A1* | 7/2014 | Graefe | G06F 11/1451 |
| | | | 707/645 |
| 2014/0351526 A1* | 11/2014 | Peterson | G06F 13/287 |
| | | | 711/149 |
| 2015/0278270 A1* | 10/2015 | Zhang | G06F 16/2379 |
| | | | 707/696 |

OTHER PUBLICATIONS

International Search Report for PCT/KR2015/008463 dated May 12, 2016 [PCT/ISA/210].

\* cited by examiner

DATA STORING METHOD USING MULTI-VERSION BASED DATA STRUCTURE

TECHNICAL FIELD

The present invention relates to a method of storing data by optimizing a multi-version based data structure in accordance with an SQLite characteristic.

BACKGROUND ART

When a small size of data is stored, an android application may use an embedded database system called SQLite.

To be more specific, the android application calls an insert operation of SQLite to store data. In this case, the SQLite generates a journal file of the existing database to store recovery information, thereby preparing for a possible system error.

In this case, since the journal file of the database is generated, EXT4 which is a file system performs journaling for storing the recovery information of the file system. The journaling is performed to maintain consistency of the file due to the generation of a new file.

Consequently, the EXT4 which is a file system may suffer from a phenomenon of journaling a journal file due to the generation of the journal file, that is, a phenomenon referred to as a journaling of journal. This phenomenon generates an additional I/O, which causes deterioration of a performance of the system.

In order to solve the above-described journaling of journal phenomenon, there is a method which stores recovery information in the database file using a multi-version based data structure, for example, a multi-version B tree, instead of generating a journal file of the database. According to this method, when a system error is incurred, the recovery may be performed using version information so that the journaling of journal phenomenon may be suppressed.

However, when the multi-version B tree is used, there may be a problem in that additional I/O is generated as follows, which will be described with reference to FIGS. 1 and 2.

Figure 1:
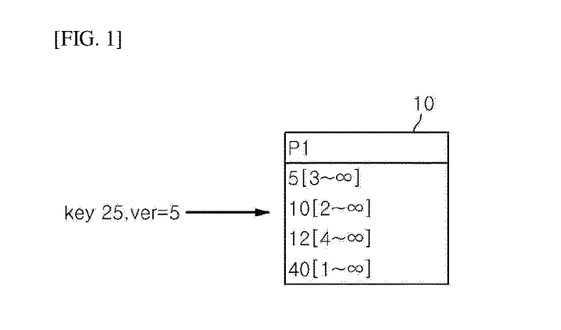
FIG. 1 is a view conceptually illustrating that new data is stored in a multi-version B tree.

FIG. 1 is a view conceptually illustrating that new data is stored in a multi-version B tree, for example, illustrates that new data having a key value of 25 is stored in a page P1(10). In this case, [starting version, ending version] of a key value 5 is [3, •], a key value 10 is [2, •], a key value 12 is [4, •], and a key value 40 is [1, •]. However, the starting version and the ending version of the key value are already known with respect to the multi-version B tree, so that a detailed description thereof will be omitted.

In FIG. 1, when it is assumed that P1(10) has four spaces for storing data, if a new key value 25 is to be stored, overflow may be caused. Therefore, the multi-version B tree stores a new key value by splitting the page while suppressing the generation of overflow, which will be described with reference to FIG. 2.

Figure 2:
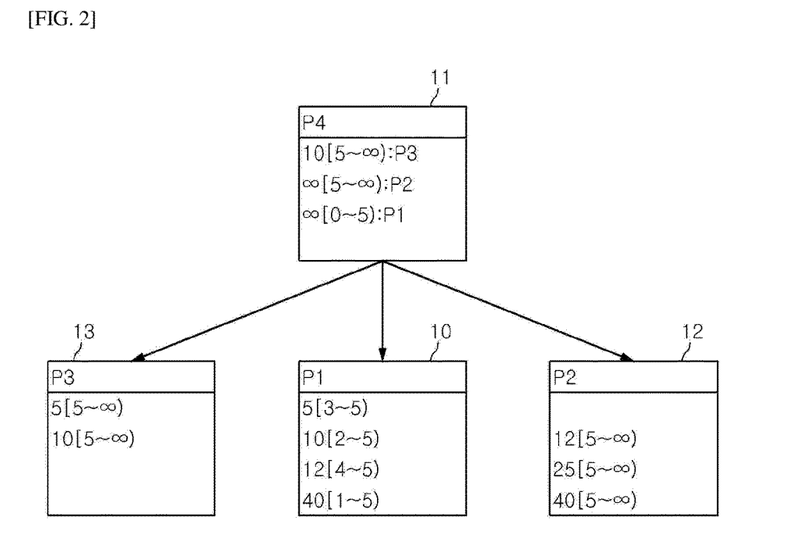
FIG. 2 is a view conceptually illustrating that page splitting is generated in a multi-version B tree according to the method of the related art.

FIG. 2 is a view illustrating that data is stored in the multi-version B tree through page splitting. Referring to FIG. 2, P2(12) and P3(13) which are neighbor pages of P1(10) are generated and a parent page P4(14) which stores information on P2(12) and P3(13) is generated. Further, when the page is split, an ending version of all key values of P1(10) is set to be "5" which is a version at a time when the page splitting is generated. In this case, a page in which the ending version of all key values is changed from the infinity to a specific version is referred to as a dead page.

As illustrated in FIG. 2, in the multi-version B tree, when the page splitting is generated, contents of a total of four pages are modified and generated. At the time of page splitting in the existing B tree, three pages are modified or generated, but four pages which are more than the existing B tree are modified or generated in the multi-version B tree. Based on this, when the page is split by adding data, additional I/O may be generated in the multi-version B tree, as compared with the existing B tree.

Further, in the multi-version B tree, when old version data is not necessary, a garbage collection procedure is periodically performed to delete the old version data. However, when the garbage collection is periodically performed, additional I/O may be generated.

DISCLOSURE

Technical Problem

An object to be achieved by the present invention is to provide a method which prevents generation of additional I/O by optimizing a multi-version based data structure in accordance with SQLite.

Technical Solution

A data storing method performed by a data storing apparatus according to an exemplary embodiment of the present invention includes (a) calling insert operation for storing first data in a first page having a space for storing data; (b) checking whether overflow in which there is no space for storing the first data in the first page occurs; (c) checking whether the overflow occurs in the first page and dead data exists in the first page; (d) generating an overflow buffer page to store the first data in the overflow buffer page when as a checking result in (c), the overflow occurs in the first page and the dead data exists in the first page and there is a transaction accessing the dead data; (e) storing the first data in the first page after deleting the dead data when as a checking result in (c), the overflow occurs in the first page and the dead data exists in the first page and there is no transaction accessing the dead data; and (f) generating a second page to store at least one data selected from data of the first page and first data in the second page and setting the at least one data selected from the data of the first page as dead data when as a checking result in (c), the overflow occurs in the first page but the dead data does not exist in the first page in which the step (e) includes storing second data in the first page when there is the second data stored in the overflow buffer page, and the step (f) includes storing third data in the second page when there is the third data stored in the overflow buffer page.

In the step (e), when the overflow buffer page overflows due to the second data, after generating the third page, at least one of the second data and the first data may be stored in the third page and at least one of the second data stored in the overflow buffer page may be set as dead data, and in the step (f), when the overflow buffer page overflows due to the third data, after generating a fourth page, at least one of the third data and the first data may be stored in the fourth page and at least one of the third data stored in the overflow buffer page may be set as dead data.

The overflow buffer page may be a page which is different from the first page and the second page and a page which is set in advance in a database in which the data is stored.

The at least one data selected in the step (f) may be selected based on a key value corresponding to the data stored in the first page and a median value of the key value.

In the step (d), as a checking result in the step (c), when overflow occurs in the first page, the dead data exists in the first page, and there is a transaction accessing the dead data, if the overflow buffer page is used, the first data may be stored in the overflow buffer page, if the overflow buffer page is not used, when a time length when the transaction accesses the dead data exceeds a predetermined waiting time, the second page may be generated to store the first data and at least one data selected from the data of the first page in the second page and set the at least one selected data as dead data.

Advantageous Effects

According to the exemplary embodiment of the present invention, the multi-version based data structure is optimized in accordance with the SQLite characteristic to prevent the generation of additional I/O and more stably maintain the system therethrough.

BEST MODE

Hereinafter, exemplary embodiments according to the present disclosure will be described in detail with reference to accompanying drawings. Further, various specific definitions found in the following description are provided only to help general understanding of the present invention, and it is apparent to those skilled in the art that the present invention can be implemented without such definitions.

The present invention relates to a data storing method in a flash memory through a multi-version data structure and more particularly discloses a method of performing lazy data splitting at the time of insert operation using a SQLite characteristic of an embedded database system, performing lazy garbage collection without generating additional I/O, performing metadata embedding by storing a file change counter corresponding to data in the most recently modified page, and generating a new page to avoid sibling redistribution through entry redistribution. By doing this, a technique which optimizes the multi-version based data structure further in accordance with the SQLite characteristic without generating additional I/O to efficiently manage a flash memory area may be provided.

Hereinafter, a B tree which is mentioned in an exemplary embodiment of the present invention refers to a data structure which stores data in the unit of page. Further, although in an exemplary embodiment of the present invention, the description is made based on a B-tree or a multi-version B tree, the spirit of the present invention is not limited thereto and for example, the spirit of the present invention may be applied to various types of data structures such as a hash table or a heap file.

Further, the data storing method using a multi-version based data structure according to an exemplary embodiment of the present invention is a hybrid implementing method of at least a part of software and hardware and is implemented on an electronic device including a processor and a memory which stores command language executed by a processor or a programmable machine which is selectively activated or reconstructed by a computer program.

Further, at least some of features and/or functionalities suggested in the exemplary embodiment of the present invention may be implemented by an end user computer system, a computer, a network server or server system, a mobile computing device (for example, a personal digital assistant (PDA), a mobile phone, a smart phone, a laptop computer, a tablet computer, or one similar thereto), a consumer electronic device, or any another appropriate electronic device, or one or more of general purpose network host machine such as an arbitrary combination thereof.

First, referring to FIG. 1 again, P1(10) is referred to as a first page 10 and it is assumed that the first page 10 has four spaces to store data. In this case, four data is already stored in the first page 10. Therefore, since data corresponding to a new key value 25 cannot be stored in the first page 10, when the new key value 25 is stored in the first page 10, overflow may be generated.

Figure 3:
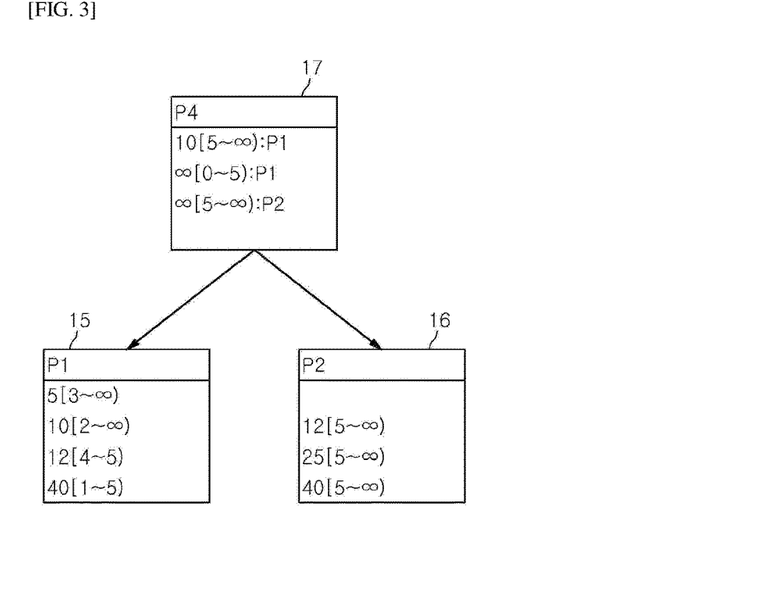
FIG. 3 is a view conceptually illustrating that lazy page splitting is generated in a multi-version data structure according to an exemplary embodiment of the present invention.

A method which stores new data while avoiding the overflow will be described with reference to FIG. 3. FIG. 3 is a view conceptually illustrating that lazy page splitting is generated in a multi-version data structure according to an exemplary embodiment of the present invention.

Referring to FIG. 3, differently from FIG. 2 in which two neighbor pages are generated, in the exemplary embodiment of the present invention, only one neighbor page is generated, that is, lazy page splitting is performed. Therefore, a page changed at the time of adding new data is three which is smaller than four so that generation of additional I/O may be suppressed as compared with the existing B tree.

In this case, according to an exemplary embodiment of the present invention, at least one is selected from data stored in the first page 15 to be stored in a second page 16 and new data is also stored in the second page 16. Further, the new data and the at least one data selected from the first page 15 which are stored in the second page 16 are stored with a version at the time of lazy page splitting as a starting version. Further, among data in the first page 15, an ending version of at least one selected data is set to the version at the time of lazy page splitting, that is, set as dead data.

Here, a method of selecting at least one data from data stored in the first page 15 is as follows. First, data included in the first page 15 is divided by a median value of a key value corresponding to each data. Thereafter, after comparing new data and the median value, it is determined that which one of the divided data the new data belongs to. Thereafter, data of the divided data to which new data belongs is stored in the second page 16 and the new data is also stored in the second page 16.

Referring to FIG. 3 based on the above method, when data of the first page 15 is divided by the median value of the key value, the data is divided into (5 and 10) and (12 and 40). 25 which is a key value corresponding to the new data belongs to (12 and 40) with respect to the median value. Therefore, (12 and 40) to which 25 belongs is stored in the second page 16 and 25 which is new data is also stored in the second page 16. Further, a starting version of the data (12 and 40) is set to a version "5" at the time of lazy page splitting in the first page and an ending version thereof is set to a version "5" at the time of lazy page splitting in the second page 16.

Next, a case when new data is stored in the first page 15 again in which dead data is stored after performing the lazy page splitting as illustrated in FIG. 3 will be described.

Figure 4:
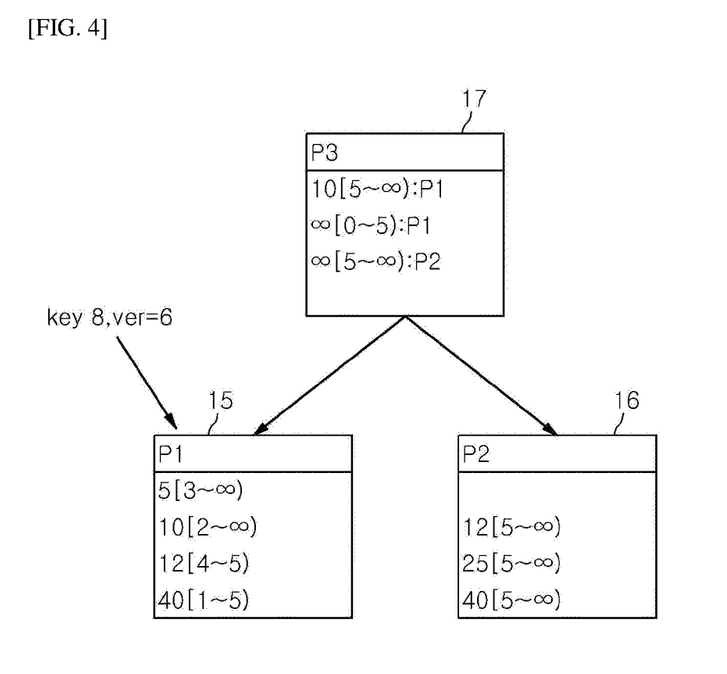
FIG. 4 is a view conceptually illustrating that new data is stored in a page including dead data in a multi-version data structure according to an exemplary embodiment of the present invention.

FIG. 4 is a view conceptually illustrating that new data is stored in a page including dead data after performing lazy page splitting in a multi-version data structure according to an exemplary embodiment of the present invention.

Referring to FIG. 4, lazy page splitting is performed in the first page 15 and thus the ending version of 12 and 40 is set to "5" which is a version at the time of lazy page splitting and new data 25 and 12 and 40 which are data split from the first page 15 are stored in the second page 16, and the starting version those of are set to "5" which is a version at the time of lazy page splitting. In this case, data having a key value of 8 may be stored in the first page, which will be described with reference to FIGS. 5 to 8.

Figure 5:
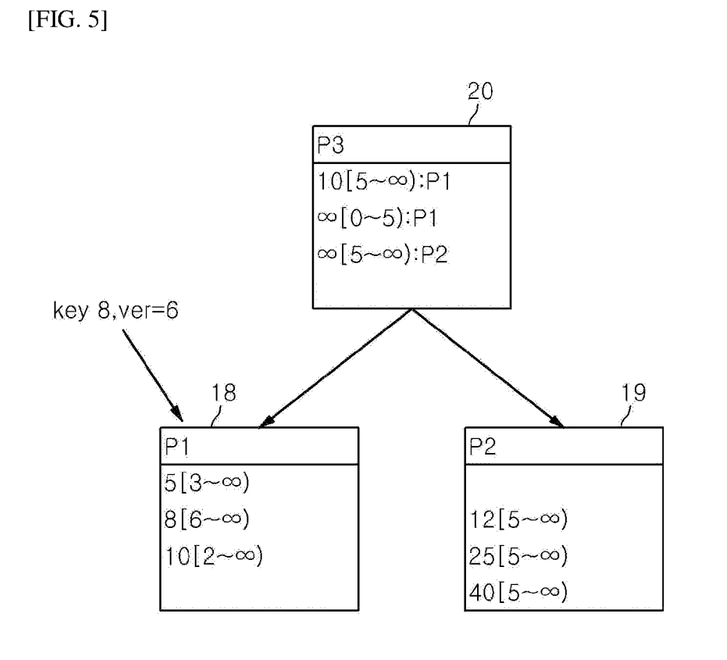
FIG. 5 is a view conceptually illustrating that lazy garbage collection is performed in a page including dead data to store new data in a multi-version data structure according to an exemplary embodiment of the present invention.

FIG. 5 is a view conceptually illustrating that lazy garbage collection is performed in a circumstance illustrated in FIG. 4 to ensure a space for storing new data and then new data is stored.

Referring to FIG. 5, dead data 12 and 40 having the ending version of "5" are deleted from the first page 18 and data having a key value of 8 is inserted in a space generated by deleting the dead data with a starting version "6". In this case, deletion of dead data 12 and 40 are referred to as lazy garbage collection. The lazy garbage collection refers that when new data needs to be stored, but there is no storage space in the page to be stored and dead data exists in the page to be stored, the dead data is deleted.

The lazy garbage collection is not periodically performed differently from the B-tree of the related art. That is, the lazy garbage collection is performed only when new data needs to be stored, there is no storage space in the page to be stored but dead data exists therein. Therefore, according to the lazy garbage collection, generation of additional I/O may be avoided.

However, in FIG. 5, the dead data may be accessed by a transaction. In this case, the dead data cannot be deleted until the access by the transaction is terminated. Therefore, in this case, the following method may be used.

First, there is a method of waiting for a predetermined time until the access by the transaction is terminated. That is, when the access by the transaction is terminated, new data is stored with a version after deleting the dead data.

Figure 6:
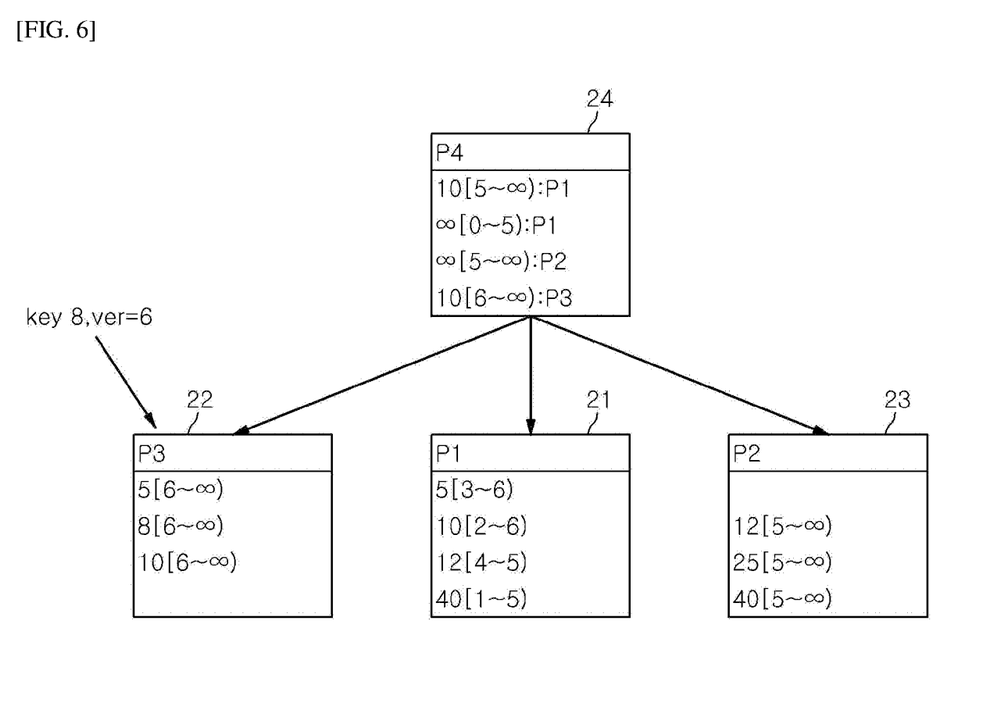
FIG. 6 is a view conceptually illustrating a method of processing a case when there is a transaction accessing dead data in a page including dead data in a multi-version data structure according to an exemplary embodiment of the present invention.

Second, there is a method of performing lazy page splitting to generate a new fifth page 22 as illustrated in FIG. 6, storing the new data in the fifth page 22 together with at least one data selected from the data stored in the first page 21, and setting the at least one selected data as dead data in the first page 21. Here, the method of selecting at least one data from the data stored in the first page 21 is the same as the method described in FIG. 3. In FIG. 6, it is understood that the new data 8 and 5 and 10 which are parts of the data stored in the first page 21 are stored in the fifth page 22 together with a starting version "6" and 5 and 10 which are the parts selected from the first page 21 are stored in the first page 21 as dead data together with an ending version "6".

Figure 7:
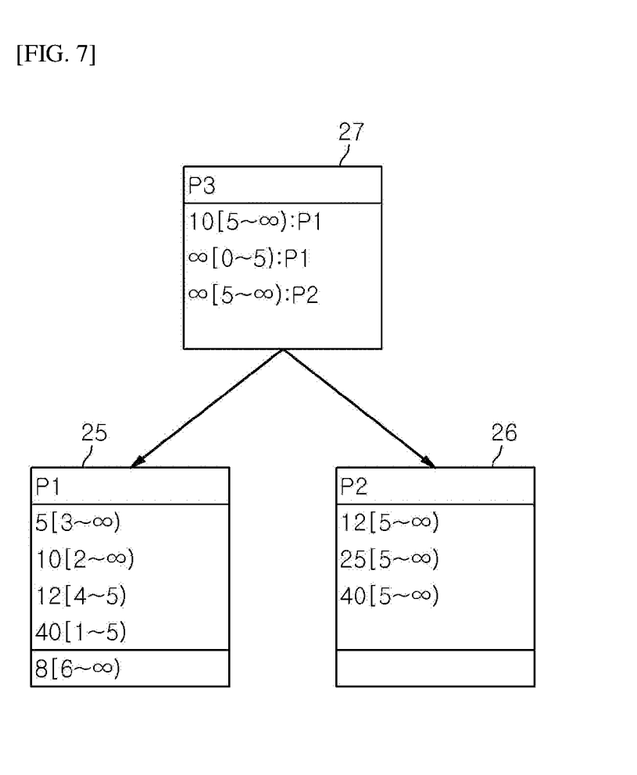
FIG. 7 is a view conceptually illustrating a method of processing a case when there is a transaction accessing dead data in a page including dead data in a multi-version data structure according to an exemplary embodiment of the present invention.

Third, as illustrated in FIG. 7, after temporarily storing new data using a reserved buffer space, when the transaction does not access the dead data any more, the dead data is deleted and new data is stored. To this end, the reserved buffer space may be provided in a page 25 which stores data as illustrated in FIG. 7. Further, a size of the reserved buffer space may vary depending on a device, a program, or an algorithm to which the method according to an exemplary embodiment of the present invention is applied and for example, when the method according to the exemplary embodiment of the present invention is applied to a smart phone, the size of the reserved buffer space may be one byte, but is not limited thereto.

Figure 8:
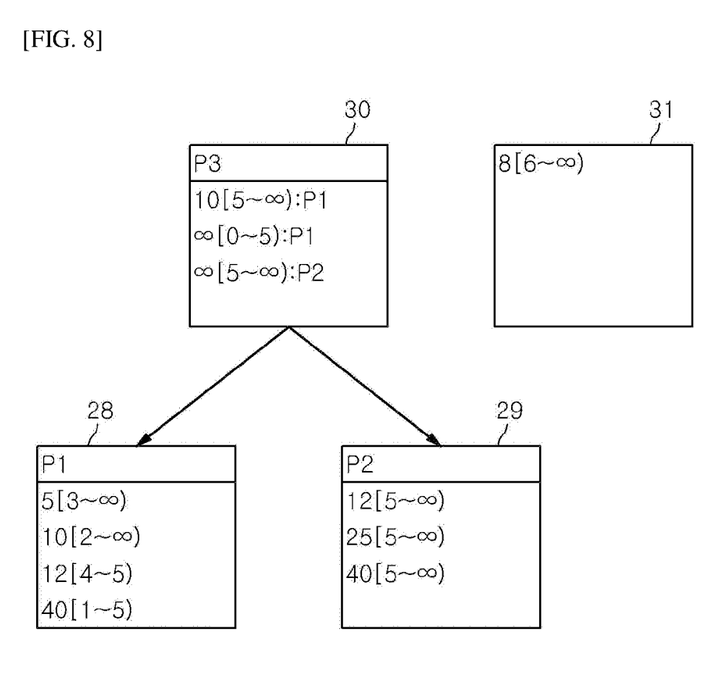
FIG. 8 is a view conceptually illustrating a method of processing a case when there is a transaction accessing dead data in a page including dead data in a multi-version data structure according to an exemplary embodiment of the present invention.

Fourth, as illustrated in FIG. 8, there is a method of temporarily storing new data using an overflow buffer page. Referring to FIG. 8, new data 8 is stored in an overflow buffer page 31. Here, the overflow buffer page 31 is a separate page which is totally different from the above-described page in which the data is stored so that the overflow buffer page 31 has a configuration which is totally different from the reserved buffer space provided in the page in the third method.

The data stored in the overflow buffer page 31 may be stored in the first page 28 according to the following method. For example, when another data is to be stored in the first page 28, it is checked whether there is data stored in the overflow buffer page 31. When there is stored data, the stored data may be stored in the first page 28 together with another data described above. Differently from this, the data stored in the overflow buffer page 31 may be stored in the first page 28 after the transaction accessing the dead data is terminated.

When the overflow buffer page 31 is used, 100% of the entire page is used to store the data. This is because the overflow buffer page 31 is generated separately from the existing pages 28 and 29 as illustrated in FIG. 8. In contrast, when the reserved buffer space is used as described in the third method, 100% of the entire pages cannot be used. This is because the reserved buffer space is provided in the existing pages 28 and 29 as illustrated in FIG. 7.

As described above, according to the exemplary embodiment of the present invention, data may be stored in the multi-version based data structure using lazy page splitting and lazy garbage collection while suppressing generation of additional I/O.

Figure 9:
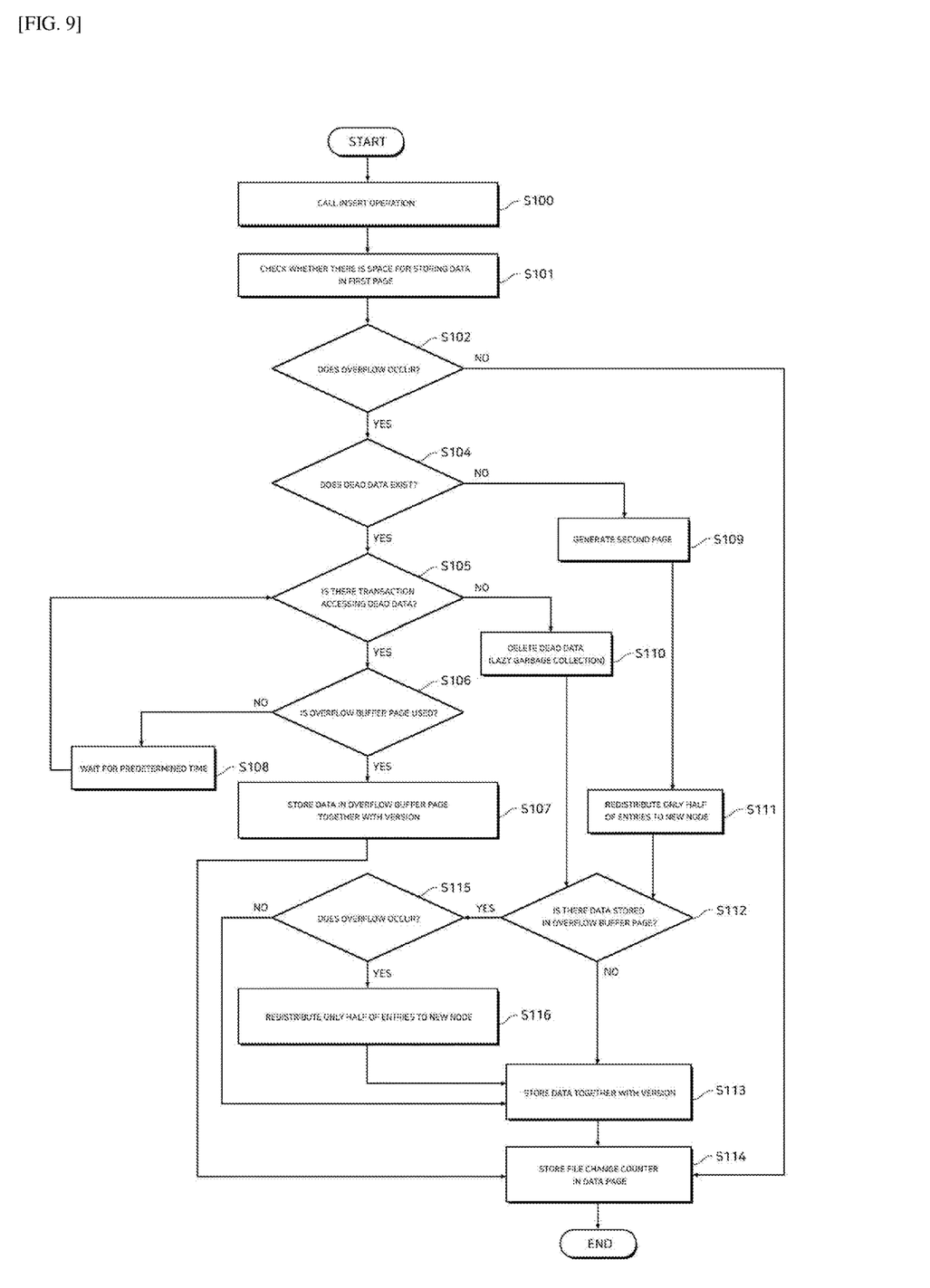
FIG. 9 is a view illustrating a process of storing new data in a multi-version data structure according to an exemplary embodiment of the present invention.

FIG. 9 is a view illustrating a process of storing new data in a multi-version data structure according to an exemplary embodiment of the present invention.

Referring to FIG. 9, first, in step S100, a predetermined platform based application calls an insert operation of a SQLite to store data in a first page and in step S101, performs a process of checking whether there is a storage space in the first page.

Here, in the multi-version based data structure to which the present invention is applied, for example, in the case of the multi-version B tree, recovery information is stored in a database file, rather than in an additional file and when a system error is incurred, the system is recovered using version information so that a journaling of journal phenomenon is not generated. Therefore, the number of additional I/O may be drastically reduced.

Next, in step S102, it is checked whether overflow is generated in the first page which is changed in accordance with data insert operation. As a result of checking, when the overflow is not generated, in step S114, a file change counter is stored in the first page.

The file change counter is a variable of 4 bytes which serves as a version for concurrency control of the database of the SQLite. When new data is inserted to the database, a value of the file change counter is increased by one. In this case, in order to prevent the generation of I/O as much as the first page where the data is stored and one data size, the file change counter is stored in the most recently modified page together with the data. By doing this, meta data embedding which prevents the meta data corresponding to actual data from being frequently generated may be performed.

Returning to step S102, when overflow occurs in the first page, it is checked whether dead data exists in the first page in step S104. When the dead data does not exist, lazy page splitting is performed to generate a second page in step S109 and at least one data stored in the first page and the new data are stored in the second page in step S111 to avoid sibling redistribution. That is, even though the sibling redistribution increases utilization of a node to improve a performance of a search operation, when the sibling redistribution is generated, four or more dirty pages are generated. Therefore, the sibling redistribution is avoided and thus the generation of additional I/O may be minimized.

Next, in step S112, it is checked whether data is stored in an overflow buffer page. When there is no stored data as a checking result, the data is stored in step S113 and a file change counter is stored in a second page in step S114. In contrast, when there is stored data, after checking whether overflow occurs in the overflow buffer page in step S115. When overflow occurs, similarly to steps S109 and S111, at least one data is selected in step S116 and new data and data which is stored in the overflow buffer page are stored in a new page in step S113. When overflow is not generated, after storing new data and the data stored in the overflow buffer page in an existing page in step S113, a file change counter of the page is stored in step S114.

Returning to step S104 again, when dead data exists in the first page, it is checked whether there is a transaction accessing the dead data in step S105. When there is no transaction accessing the dead data as a checking result, lazy garbage collection which deletes the dead data is performed in step S110 and then the sequence moves to step S112 to follow the subsequent steps.

In contrast, when there is transaction accessing the dead data as the checking result, the sequence moves to step S106.

In step S106, it is checked whether the overflow buffer page is used. When the overflow buffer page is used as a checking result, new data is stored in the overflow buffer page in step S113 and the sequence follows the subsequent steps. In contrast, when the overflow buffer page is not used as a checking result, after waiting for a predetermined time in step S108, the sequence moves to step S105 again to check whether there is a transaction accessing dead data.

Figure 10:
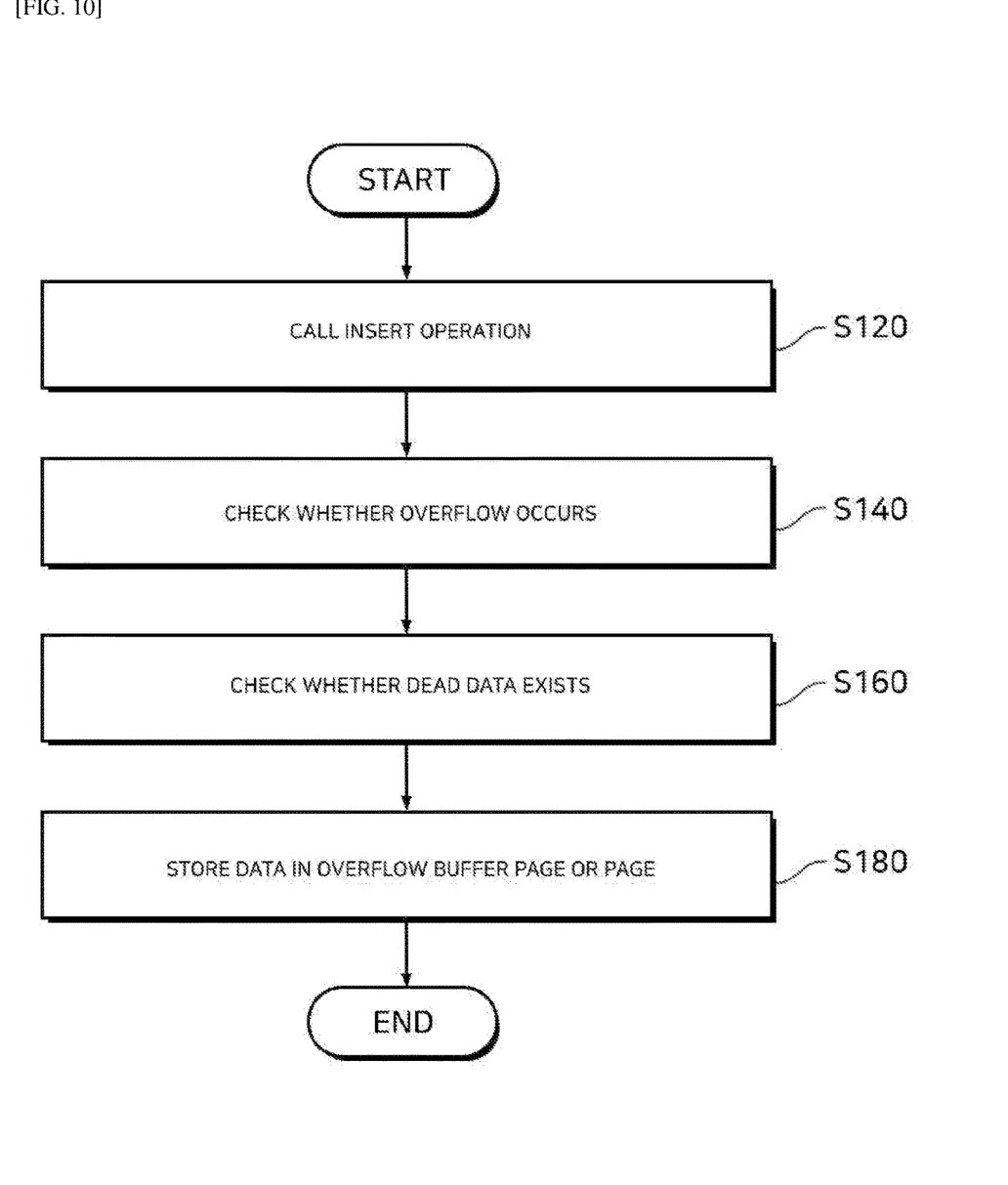
FIG. 10 is a view illustrating a procedure of a method of storing new data in a multi-version data structure according to an exemplary embodiment of the present invention.

FIG. 10 is a view illustrating a procedure of a method of storing new data in a multi-version data structure according to an exemplary embodiment of the present invention.

Referring to FIG. 10, a method of storing new data in a multi-version data structure according to an exemplary embodiment of the present invention may be performed by a data storing apparatus.

The data storing method includes a step S120 of calling insert operation for storing first data in a first page having a space for storing data, a step S140 of checking whether overflow in which there is no space for storing the first data in the first page occurs, a step S160 of checking whether the overflow occurs in the first page and dead data exists in the first page, and a step S180 of storing first data in an overflow buffer page or storing data in the first page.

Here, when the overflow occurs in the first page and dead data exists in the first page and there is a transaction accessing the dead data, an overflow buffer page is generated to store the first data in the overflow buffer page. When the overflow occurs in the first page and dead data exists in the first page and there is no transaction accessing the dead data, after deleting the dead data, the first data is stored in the first page. Further, the overflow occurs in the first page but the dead data does not exist in the first page, a second page is generated to store at least one data selected from the data of the first page and the first data in the second page and at least one data selected from the data of the first page may be set as dead data.

As described above, according to the exemplary embodiment of the present invention, data may be stored in the multi-version based data structure using lazy page splitting and lazy garbage collection while avoiding generation of additional I/O.

As described above, the data storing method through a multi-version B tree which performs lazy page splitting according to the exemplary embodiment of the present invention may be performed by an apparatus for storing data. While the present invention has been described with reference to specific embodiments thereof, various modifications may be carried out without departing from the spirit and scope of the present invention. Accordingly, the scope of the present invention is not defined by the aforementioned embodiment, but shall be defined in the claims and their equivalent.

The invention claimed is:

1. A data storing method performed by a data storing apparatus, the method comprising:
   (a) calling insert operation for storing first data in a first page having a space for storing data;
   (b) checking whether overflow in which there is no space for storing the first data in the first page occurs;
   (c) checking whether the overflow occurs in the first page and dead data exists in the first page,
   (d) generating an overflow buffer page to store the first data in the overflow buffer page without deleting the dead data when as a checking result in (c), the overflow occurs in the first page and the dead data exists in the first page and there is a transaction accessing the dead data;
   (e) storing the first data in the first page after deleting the dead data when as the checking result in (c), the overflow occurs in the first page and the dead data exists in the first page and there is no transaction accessing the dead data; and (f) generating a second page to store at least one data selected from data of the first page and the first data in the second page and setting the at least one data selected from the data of the first page as the dead data in the first page when as the checking result in (c), the overflow occurs in, the first page but the dead data does not exist in the first page, wherein the step (e) includes storing second data in the first page when there is the second data stored in the overflow buffer page, wherein the step (f) includes storing third data in the second page when there is the third data stored in the overflow buffer page, wherein in the step (a), the first data has a key value and a version corresponding to the key value of the first data, wherein in the step (f), the first data and the at least one data, which are stored in the second page, are stored with the version of the first data as a starting version, and wherein as ending version of the at least one data stored in the first page is set to be identical to the version of the first data so that the at least one data stored in the first page is set as the dead data.

2. The data storing method of claim 1, wherein in the step (e), when the overflow buffer page overflows due to the second data, after generating a third page, at least one of the second data and the first data are stored in the third page and at least one of the second data stored in the overflow buffer page is set as the dead data, and in the step (f), when the overflow buffer page overflows due to the third data, after generating a fourth page, at least one of the third data and the first data are stored in the fourth page and at least one of the third data stored in the overflow buffer page is set as the dead data.

3. The data storing method of claim 1, wherein the overflow buffer page is a page which is different from the first page and the second page and a page which is set in advance in a database in which the data is stored.

4. The data storing method of claim 1, wherein the at least one data selected in the step (f) is selected based on a key value corresponding to the data stored in the first page and a median value of the key value.

5. The data storing method of claim 1, wherein in the step (d), as the checking result in the step (c), when overflow occurs in the first page, the dead data exists in the first page, and there is a transaction accessing the dead data, if the overflow buffer page is used, the first data is stored in, the overflow buffer page, if the overflow buffer page is not used, when a time length when the transaction accesses the dead data exceeds a predetermined waiting time, the second page is generated to store the first data and at least one data selected from the data of the first page in the second page and set the at least one selected data as the dead data.

* * * * *